US009973953B2

United States Patent
Karlsson (10) Patent No.: US 9,973,953 B2
(45) Date of Patent: May 15, 2018

(54) METHOD AND SYSTEM FOR NETWORK ERROR DETECTION

(71) Applicant: ICOMERA AB, Göteborg (SE)

(72) Inventor: Mats Karlsson, Göteborg (SE)

(73) Assignee: ICOMERA AB, Gothenburg (SE)

( * ) Notice: Subject to any disclaimer, the term of this patent is extended or adjusted under 35 U.S.C. 154(b) by 0 days. days.

(21) Appl. No.: 15/309,602

(22) PCT Filed: May 6, 2015

(86) PCT No.: PCT/EP2015/059951
§ 371 (c)(1),
(2) Date: Nov. 8, 2016

(87) PCT Pub. No.: WO2015/169855
PCT Pub. Date: Nov. 12, 2015

(65) Prior Publication Data
US 2017/0188249 A1    Jun. 29, 2017

(30) Foreign Application Priority Data
May 8, 2014   (EP) .................................. 14167528

(51) Int. Cl.
*H04W 24/00*    (2009.01)
*H04W 24/08*    (2009.01)

(52) U.S. Cl.
CPC ........... *H04W 24/08* (2013.01); *H04W 24/00* (2013.01)

(58) Field of Classification Search
CPC .............................. H04W 24/08; H04W 24/00
(Continued)

(56) References Cited

U.S. PATENT DOCUMENTS 6,157,618 A  * 12/2000 Boss .................... H04L 41/5009
                                                       370/252
8,798,548 B1 *  8/2014 Carbajal ............... H04W 24/08
                                                       455/67.11
(Continued)

FOREIGN PATENT DOCUMENTS

EP    1 175 757 A1    1/2002
EP    2 665 331 A1    11/2013
WO    WO 00/67435 A1  11/2000

OTHER PUBLICATIONS

International Search Report (PCT/ISA/210) dated Jul. 7, 2015, by the European Patent Office as the International Searching Authority for International Application No. PCT/EP2015/059951.
(Continued)

Primary Examiner — Marceau Milord
(74) Attorney, Agent, or Firm — Buchanan Ingersoll & Rooney P.C.

(57) ABSTRACT

A method for identifying a source of error in a communication network including at least one client configured to be connected to a base station is disclosed. The at least one client is arranged on a vehicle repetitively moving in a predetermined area. The method includes the steps of: collecting signal quality data from the at least one client for an extended time period when moving in the area, the signal quality data including a plurality of data entries; determining a position in the area at which each of the data entries was collected and a time at which each of the data entries was collected; identifying an anomaly in the signal quality data, by comparing newly collected signal quality data with previously collected data. A source of error may be determined from the time and position when the signal quality data having an anomaly was collected.

18 Claims, 3 Drawing Sheets

(58) Field of Classification Search
USPC .......................................................... 455/423
See application file for complete search history.

(56) References Cited

U.S. PATENT DOCUMENTS

| | | | | |
|---|---|---|---|---|
| 8,868,005 B1* | 10/2014 | Carbajal | ............... | H04W 24/08 455/67.11 |
| 8,977,212 B2* | 3/2015 | Carbajal | ............... | H04W 24/08 455/67.11 |
| 9,008,587 B2* | 4/2015 | Carbajal | ............... | H04W 24/08 455/67.11 |
| 9,078,162 B2* | 7/2015 | Garcia | ................. | H04W 24/08 |
| 2002/0063656 A1 | 5/2002 | Gutowski | | |
| 2003/0224806 A1* | 12/2003 | Hebron | ................ | H04W 24/00 455/457 |
| 2005/0287954 A1 | 12/2005 | Lim et al. | | |
| 2006/0095348 A1* | 5/2006 | Jones | ........................ | G01S 5/02 705/29 |
| 2009/0031006 A1* | 1/2009 | Johnson | ............. | G06F 17/3087 709/218 |
| 2011/0009056 A1* | 1/2011 | Hanson | .............. | H04B 7/15535 455/9 |
| 2013/0310021 A1 | 11/2013 | Bergek et al. | | |
| 2015/0189528 A1* | 7/2015 | Carbajal | ............... | H04W 24/08 370/252 |
| 2016/0205238 A1* | 7/2016 | Abramson | ......... | G01C 21/3484 455/456.4 |

OTHER PUBLICATIONS

Written Opinion (PCT/ISA/237) dated Jul. 7, 2015, by the European Patent Office as the International Searching Authority for International Application No. PCT/EP2015/059951.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)", 3GPP Standard; 3GPP TS 37.320, 3rd Generation Partnership Project (3GPP), Mobile Competence Centre ; 650, Route Des Lucioles ; F-06921 Sophia-Antipolis Cedex; France, vol. RAN WG2, No. VI2.0.0, Mar. 17, 2014 (Mar. 17, 2014), pp. 1-23, XP050769947.

* cited by examiner

METHOD AND SYSTEM FOR NETWORK ERROR DETECTION

TECHNICAL FIELD

The present invention relates to a method and a system for error detection in a communication network, comprising at least one client in a moving vehicle.

BACKGROUND OF THE INVENTION

The demands on wireless communication capabilities in today's society are increasing rapidly. In particular, fast and easily accessible communication is desired through hand-held devices over large areas. It is particularly challenging to achieve such communication for mobile devices which are moving, e.g. when moving over large distances with poor network coverage or when affected by unknown sources of noise interrupting a signal for communication. In particular, if a client, being for example a mobile phone, moves over large areas the client has to connect to several base stations in order to maintain a sufficient connection for communication.

The mobile nature of a client with respect to the base stations may introduce several potential sources of communication performance degradation. Such sources may derive from complex terrain, competition for available channels, or the source may be an unknown source of noise related to e.g. radio-frequency interference.

Diagnosing and identifying the sources causing performance degradation is desirable in order to solving the problems and for providing improved communication quality. Measurement of the signal strength from a client may be used for simpler measurements, such as finding areas of poor network coverage. However, problems of more complex nature are more difficult to detect. There may for example be problems related to the base stations and/or clients themselves, and/or more inconsistent sources of radio-frequency interference which are not straight-forward to identify and/or diagnose.

Thus, a drawback of prior art solutions is that they are incapable of reliably identifying problems at hardware (e.g. a base station) because the information related to the signal strength is obtained via the hardware itself.

Another drawback is that more complex sources of noise or disturbances, e.g. being inconsistent in time, are difficult to identify due to unknown and/or unpredictable times of presence of the source.

SUMMARY OF THE INVENTION

In view of the above mentioned need, a general object of the present invention is to provide method and a system for identifying a source of error in a communication network which at least to some extent alleviates the above-discussed drawbacks of the prior art, and at least partly fulfils the above-discussed needs.

According to a first aspect of the present invention, it is therefore provided a method for identifying a source of error in a communication network comprising at least one client configured to be connected to a base station, wherein said at least one client is arranged on a vehicle repetitively moving in a predetermined area comprising at least one base station, and wherein said vehicle is provided with at least one fixed external antenna through which the client and the base station communicates, said method comprising the steps of:

collecting signal quality data from said at least one client for an extended time period when moving in said area, said signal quality data being indicative of the signal quality between said at least one client and said at least one base station, said signal quality data comprising a plurality of data entries;

determining a position in said area at which each of said data entries was collected and a time at which each of said data entries was collected;

identifying an anomaly in said signal quality data, by comparing newly collected signal quality data with previously collected data; and determining, for at least one identified anomaly, from the time and position when said signal quality data having an anomaly was collected, a source of error in said communication network.

In accordance with the invention, a communication network may be e.g. a wireless wide-area network (WWAN).

An "area" may for example be the route covered by a train, bus, or similar. The area may furthermore be the area of a city where taxi cars or other vehicles are operating. Note that the "area" is herein not only the area where the vehicle (with its client) is driving but also comprises the area where a base station which may connect to the client is present. Thus, the area is the area which covers the vehicle and the base station.

Vehicle repetitively moving in a predetermined area may e.g. be taxis, delivery vehicles, etc. However, the invention is particularly useful when implemented on trains, buses and other public transportation vehicles. Buses, trains and other public transportation vehicles typically moves along fixed routes at fixed times in a very constant, repetitive manner, which makes the collected data very useful for identifying anomalies in time and/or space.

The vehicles are further provided with at least one fixed external antenna through which the client and the base station communicate. Hereby, the signaling and communication conditions for the antenna are always the same, which also makes the collected data very useful for identifying anomalies in time and/or space. In contrast, e.g. handheld clients are subject to very varying signaling conditions over time, since it is held in different positions, at various distances from the head, at various heights, etc. This makes the data difficult to use for comparison, and for detecting context related anomalies, since it is obscured by the differences experienced due to the clients operating conditions. However, by measuring signal quality when using fixed, external antennas, this is efficiently remedied.

Further, the invention is particularly useful in vehicles being provided with an on-board router for providing communication between client terminals within the vehicle and exterior wireless networks. The router is a networking router, which is a machine that forwards data packets between computer networks, on at least one data link in each direction. The router may be a mobile access router, and preferably a mobile access and applications router.

The router may operate through a plurality of exterior mobile networks, which are simultaneously useable. Also, the router may be arranged to communicate with the communication server on at least two different data links (communication routes) having different characteristics, and to automatically separate the communication traffic between said data links based on the evaluation. The communication can be automatically optimized based on static or dynamic parameters, such as signal strength and the like. Such optimizations are per se known from EP 1 175 757 and EP 2 665 331 by the same applicant, said documents hereby being incorporated by reference. An automatic selection is then made among the available data links to use the most efficient combination. Hence, a seamless distribution of the data among the different data links is obtained.

The router may use any available data links, such as two or more of e.g. GSM, Satellite, HSPA, EDGE, 1× RTT, EVDO, LTE, LTE-A, WiFi (802.11) and WiMAX; and combine them into one virtual network connection. In particular, it is preferred to use data links provided through wireless wide-area network (WWAN) communication technologies.

An anomaly should be considered as a deviation or a peculiar feature present in the newly collected data compared to previously collected data. The anomaly may for example be a drop in signal strength or an increase in noise at a particular time and/or location in a signal to/from a client or a base station.

The client useable to collect signal quality data may be client terminals used within the moving vehicle. However, the clients may also be realized in communication equipment fixedly arranged in the moving vehicle, such as a router or modem arranged in a train.

With the present invention, signal quality data indicative of the quality of a signal transmission from a base station to a client, or vice versa, is collected for an extended period of time. The signal quality data may for example be collected by a central control unit e.g. wirelessly connected to the communication network. The period of time may for example be in the range from some hours to weeks. The period of time may be dependent on the number of samples within said time period. Thus, when the number of samples per time period is low, the period of time may be very long, such as several months, or even a year or several years. Preferably, the period of time is selected such that an adequate number of samples are obtained.

Furthermore, the collected signal quality data is sampled at a sampling rate, thus a collection of signal quality data comprises a plurality of data entries. As the vehicle carrying the client, moves around in the area signal quality data is collected from the client. Furthermore, a time when a particular data entry was collected and a position at which the client was located when the particular data entry was collected is determined. In this way, each data entry is provided with a related time and a related position. Thus, the signal quality of a client may be tracked in time and position. In this way, it is possible to have information about the signal quality of the client, connected to a base station, at a time instance and a related position of the client from which a signal was received/transmitted to/from a base station at the time instance.

In accordance with the invention, the newly collected data is compared with the previously collected data. For example, previously collected data may have been collected for hours, days, or weeks. In case there is a deviation between the previously collected data and the newly collected data, it may be determined that an anomaly is identified and subsequently a source of error may be determined. Preferably, if the deviation exceeds a predetermined threshold value it may be determined that an anomaly is identified. Moreover, periodic increases in e.g. noise in the newly collected data may indicate that there is a source of error. The comparison to previously collected data may be based on a median value, or a mean value over a certain period of time, or a certain number of collected samples. For the purpose of identifying deviations, statistical outliers can also be filtered out from previously collected data by a variety of means, thus determining the subset which shall be considered normal behavior. Parameters for acceptable values can then be determined from such a subset.

Alternatively, signal quality data collected from clients may be compared with default signal quality data based on previously collected signal quality data. The new signal quality data may then be compared with the standardized signal quality data (e.g. signal-to-noise data) using e.g. pattern analysis. In this case, periodic increases in noise in the new signal quality data compared to the standardized signal quality data may be an anomaly and thus indicate a source of error. The time and position related to the data entries corresponding to the anomaly then enables identifying the source of error.

A non-exhaustive list of potential sources of error which may cause an anomaly in the collected data is: a malfunctioning base station, malfunctioning hardware of the client (e.g. a poor antenna in the client), radio-frequency interference from external sources, damaged antenna cables or antenna connectors, etc.

The present invention provides a cost efficient solution for identifying sources of noise and disturbances in a communication network. The invention uses the clients already moving in the area of the communication network, and collects signal quality data from clients in use or not in use. Thereby, analysis such as signal processing and pattern recognition of signal quality data already existing due to normal communication of the clients is used for identifying sources of noise, disturbances, malfunction, etc. Furthermore, the measurements can be made continuously, without affecting the normal operation of the wireless communication system.

The method advantageously comprises determining average signal quality data from the previously collected signal quality data, and comparing the newly collected signal quality data with the set signal quality data, such as an average, median or filtered signal quality data. In other words, a set signal quality data is based on the previously collected data, and an anomaly is identified by finding a deviation in the newly collected data from the average signal data.

An average formed over a certain time period, or over a certain number of samples, is easy and straightforward to implement. However, if the anomaly to be detected has been frequent also in the past, there is a risk that the anomaly will affect the average value significantly. To this end, it may be preferred to use a median value for entries received over a certain time period, or over a certain number of samples. A median value is less affected by anomalies in the previously collected data. However, filtering and the like may also be used. For example, it is possible to leave all entries having a signal quality below a certain threshold out, and calculate an average or median value only for the remaining entries. It is also possible to compare newly collected data with several various aggregations of the previously collected data, such as average values based on different time periods, and/or different number of samples, both average and median values, both median values and filtered median values, etc.

In one embodiment of the invention, signal quality data may advantageously be collected from several clients, arranged on several vehicles. Thereby, due to the typically large number of clients moving in an area, for example clients on-board taxi cars, a large amount of signal quality data may be collected at different times and positions in the area, providing for a thorough diagnosis and identification of a source of error such as a source of noise. For example, in many cities there are a vast number of taxi cars moving in the area of the city. The taxi cars may then be provided with an external antenna, and a fixed communication equipment operating as a client, to be connected to different base stations depending on the position of the taxi cars in the city. In the same way, measurements can be made from buses, trains, etc. Signal quality data collected from the clients in this case may be analyzed in order to find anomalies in the data. For example, there may be an anomaly occurring at a particular time and place every week indicating a source of noise being operative only at certain times. Thereby, a source of noise may be efficiently identified using the invention. The previously collected data may in the case of several clients be collected from more than one client, for example from several thousands of clients. The range of acceptable signal qualities based on the previously collected signal quality may be formed as an average signal quality data, a median value of the signal quality data, a filtered average, etc, formed from the average of the collected signal quality data from more than one client, for example from all the clients in the communication network.

A particular example is a train or bus frequently and repetitively moving along a predetermined route. On the train or bus, there may be a fixed router and/or modem which may function as a client for performing the measurements, or separate terminals connected to the router and/or modem may be used as the clients for this purpose. As the trains moves along the route, the clients, e.g. using different network providers, connect to different base stations depending on e.g. which base station is closest to the train (or at least closest to the clients). If the signal quality (e.g. signal strength) is consistently low at a particular point along the route for all of the clients connected to the same base station, regardless of the time of day, and the signal strength is higher when the clients are connected to other base stations along the route, a problem (source of error) is likely to exist with that base station.

According to an embodiment of the invention, the method may further comprise determining said set signal quality, such as an average or median value, from previously collected signal quality data collected from clients connected to base stations other than the base station connected to said at least one client when said newly collected data was collected corresponding to said anomaly. Thereby, a source of noise related to a particular base station located in an area of several base stations may be identified. For example, an anomaly may be detected by comparing a first (previous) signal quality data collected from clients connected to a properly functioning base station with a second (new) signal quality data collected from clients connected to a poorly functioning base station. Thus, a deviation between the first and second signal quality data may indicate a source of error at the poor base station.

The method of the invention may further comprise storing the collected signal quality data in a database together with a position and time for each data entry, and also in association with each data entry, at least one, and preferably a plurality of contextual parameters, and in particular one or several of:

a base station identifier, indicative of which base station the client is currently connected to when signal quality data is collected;
information about the communication technology used when the signal quality data was collected, such as GSM, Satellite, DVB-T, HSPA, EDGE, 1× RTT, EVDO, LTE, WiFi (802.11) and WiMAX;
information about the frequency or frequency band at which the communication occured;
information about the vehicle type;
information about the type of external antenna used on the vehicle; and
information about the direction of the antenna/vehicle, in case the external antenna has high directivity.

When comparing newly collected data about signal quality with previously collected data, it is possible to compare with only a subset of the previously collected data, related e.g. to the same communication technology and the same type of vehicle as in the newly collected data. For example, newly collected data collected from a train using LTE technology may be compared only with previously collected data collected from trains and using LTE. Signal quality will vary between different communication technologies, even though the context is entirely the same, due to the differences in these technologies. Further, different types of external antennas will provide different signal quality. Further, different vehicles will provide different signal quality, due to e.g. different length of cable to connect the communication equipment to the external antenna, placement of the external antenna at different heights, etc. By storing information about this together with the data entries, and comparing only data having the same or similar contexts, it is easier to identify anomalies, since the differences are then not obscured by inherent contextual differences.

However, it is also possible to compare newly collected data with previously collected data related to different contexts. For example, the differences between different types of external antennas will normally be a few dB, and large anomalies, e.g. related to 10 or 20 dB, or more, will be apparent even though measurement data related to different types of external antennas are considered.

Further, when using previously collected data having differences in one or several contextual parameter(s), a correction factor may be used. Such a correction factor can e.g. easily be determined empirically, and may use to increase or increase the data entries related to a certain instance of the contextual parameter to match data entries related to another instance of the contextual parameter. For example, signal quality data obtained by one type of external antenna may be corrected, by division, multiplication, addition and/or subtraction by the one or several correction factors, to match signal quality data obtained by another type of external antenna.

According to an embodiment of the invention, said signal quality data may comprise signal strength and/or signal-to-noise data. In case of signal strength, an anomaly may be determined if the deviation between previously collected data and newly detected data exceeds a threshold, e.g. 3 dB. A measurement of the signal strength may be made in terms of the received signal strength indicator (RSSI), received channel power indicator (RCPI), or a similar standard. The signal quality data may be measured as coded, total signal strength, as decoded signal strength, or as a combination of these, such as difference between the coded, total signal strength and the decoded signal strength, thereby providing a signal-to-noise ratio.

According to an embodiment of the invention, said signal quality data may comprise data indicative of a connection technology type, voice call quality indicator, channel frequency and bandwidth, network latency, and/or data throughput. The connection technology type is relevant for interpretation of the signal quality data, such as signal strength. Network latency is a delay of a signal from e.g. a base station to the client or vice versa. Data throughput is the amount of data being successfully sent across the communication network per unit time, for example in terms of data bits per second. The channel frequency and bandwidth may be used for noise estimation in a particular frequency bandwidth.

Furthermore, the method may comprise interpolating said position from a real-time locating system. For example, a real-time locating system may be a global positioning system (GPS) of the client, or connected to the client, and/or part of wireless wide area network communication (WWAN). In addition, or as an alternative to GPS, other global navigation satellite systems (GNSS) such as Galileo, GLONASS or Compass can be used.

According to a second aspect of the present invention, there is provided a system for identifying a source of error in a communication network comprising at least one client connected to a base station, wherein said at least one client is arranged on a vehicle repetitively moving in a predetermined area, wherein said vehicle is provided with at least one fixed external antenna through which said client and said base station communicates, said system comprising a central control unit configured to execute the steps according to the first aspect of the invention, wherein said central control unit is configured to receive said signal quality data over said communication network.

According to an embodiment of the invention, the system may further comprise a real-time locating system. The real-time locating system may advantageously be a global navigation satellite systems (GNSS) unit, such as a GPS unit, of said client, or connected to said client.

Effects and features of this second aspect of the present invention are largely analogous to those described above in connection with the first aspect of the invention and embodiments mentioned are largely compatible with embodiments mentioned in connection with the first aspect of the invention.

According to a third aspect of the present invention, there is provided a computer program product comprising a computer readable medium having stored thereon computer program means for executing the steps of the first aspect of the invention.

Effects and features of this third aspect of the present invention are largely analogous to those described above in connection with the first aspect and/or second aspect of the invention and embodiments mentioned are largely compatible with embodiments mentioned in connection with the first and/or second aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles, such as buses and the like.

Figure 1:
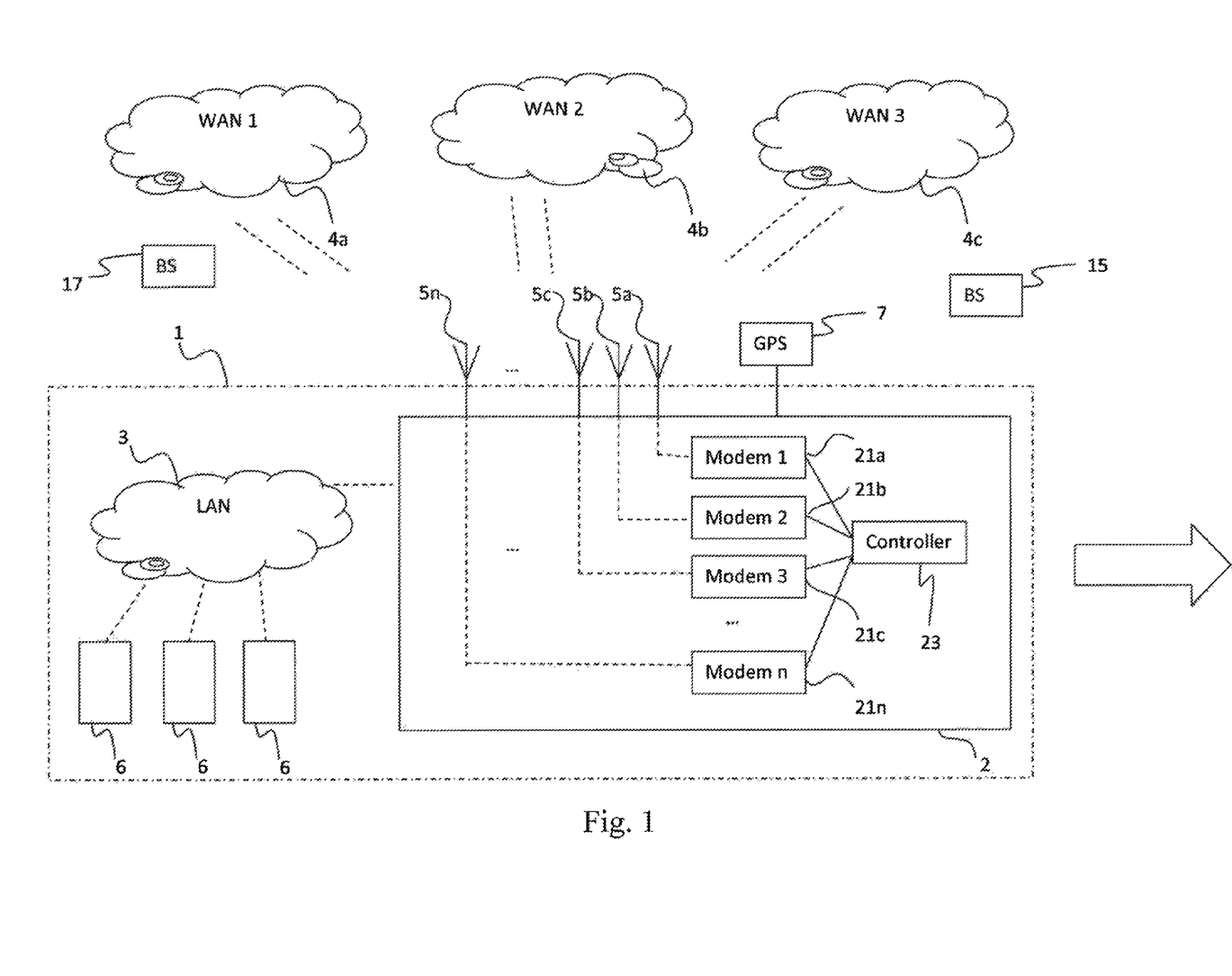
FIG. 1 schematically illustrates a train and a number of clients illustrating an exemplary embodiment of the invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Communication to and from the WANs is provided through one or several external antennas 5 a-n on the vehicle roof. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs and so on.

The data communication router comprises a plurality of modems 21 a-n. Assignment of data streams to different WANs and/or to different data links on one WAN is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the vehicle, and wherein the controller may be arranged to assign data streams to various data links also partly in dependence on said received GPS signals.

The data communication router may also be denominated MAR (Mobile Access Router) or MAAR (Mobile Access and Applications Router).

The data communication router is preferably arranged to communicate on at least two different communication routes having different characteristics. Hereby, the communication can be automatically optimized based on specific conditions, such as price, speed, etc. Such data communication routers are e.g. known from EP 1 175 757 by the same applicant, said document hereby incorporated by reference. Such routers are also commercially available from the applicant, Icomera AB. Hereby, the router may use all available data channels, such as two or more of e.g. GSM, Satellite, DVB-T, HSPA, EDGE, 1× RTT, EVDO, LTE, WiFi (802.11) and WiMAX; and combine them into one virtual network connection. An automatic selection may be made among the available channels to use the most cost effective combination that fulfils the users' availability, bandwidth and reliability requirements. Hence, a seamless distribution of the data among said different channels can be obtained.

The communication network is in this case a wireless wide-area network (WWAN). As the train moves along its predetermined route in a predetermined area, the train may pass several base stations, in this case two base stations 15 and 17 are shown. The measurement to determine e.g. signal strength and signal quality can be made by terminal units 6, but is preferably made by the router 2 and/or modems 21, acting as clients on the exterior network. Depending on the location of the train, the client(s) on the train may be connected and in communication with one of the base stations 15 or 17. Thus, if the train is moving in the direction of the arrow, the client(s) may first have been connected to base station 15 and then at a later time connected to base station 17, and possibly to both base stations when in between. A central control unit, e.g. realized within the router 2, is arranged to collect signal quality data from the client(s). The signal quality data is indicative of the signal quality between the client(s) and a base station presently connected to the corresponding base station (i.e. base station 15 or 17). The signal quality data comprises several signal quality data entries, stored in a database. Furthermore, each of the signal quality data entries each has a corresponding time and position related to the time when the corresponding data entry was collected and to the position of the corresponding client at the corresponding time. For example, if the client is connected to base station 15 at time T and is located in position P when a signal quality data entry was collected, time T and position P ("P as a function of T") is associated with that data entry. Similarly, other clients, also connected to base station 15, has time and position T' and P' related to a data entry.

When the train moves along the predetermined route, signal quality data is collected by the central control unit from the client(s). The signal quality data may for example be related to signal strength between each of the clients and a corresponding base station 15, 17. Since the train probably travels along the same route frequently, signal quality data may be collected over extended time periods. It may occur that the clients, or at least some of the clients, consistently receive a signal having weak signal strength from base station 17. In other words, signal quality data previously connected indicates stronger signal strength compared to the newly collected signal quality data. For example, the newly collected signal quality data may indicate a few dB signal loss, such as 3 dB signal loss, compared to the previously collected signal quality data. This deviation may be identified as an anomaly in the collected data. Furthermore, a time and a position related to the anomaly indicate at what position the client was located when the data entry (entries) of the anomaly was (were) collected. Furthermore, the signal quality data advantageously comprises a database identifier and/or a client identifier. In this way, for example with a database identifier, a particular database may be identified and thereby associated with the anomaly. Alternatively, the position and time of the data entry (entries) related to the anomaly (in this case signal loss) may indicate at which base station an error lays. In this way a source of error is detected at the base station 17.

Figure 2:
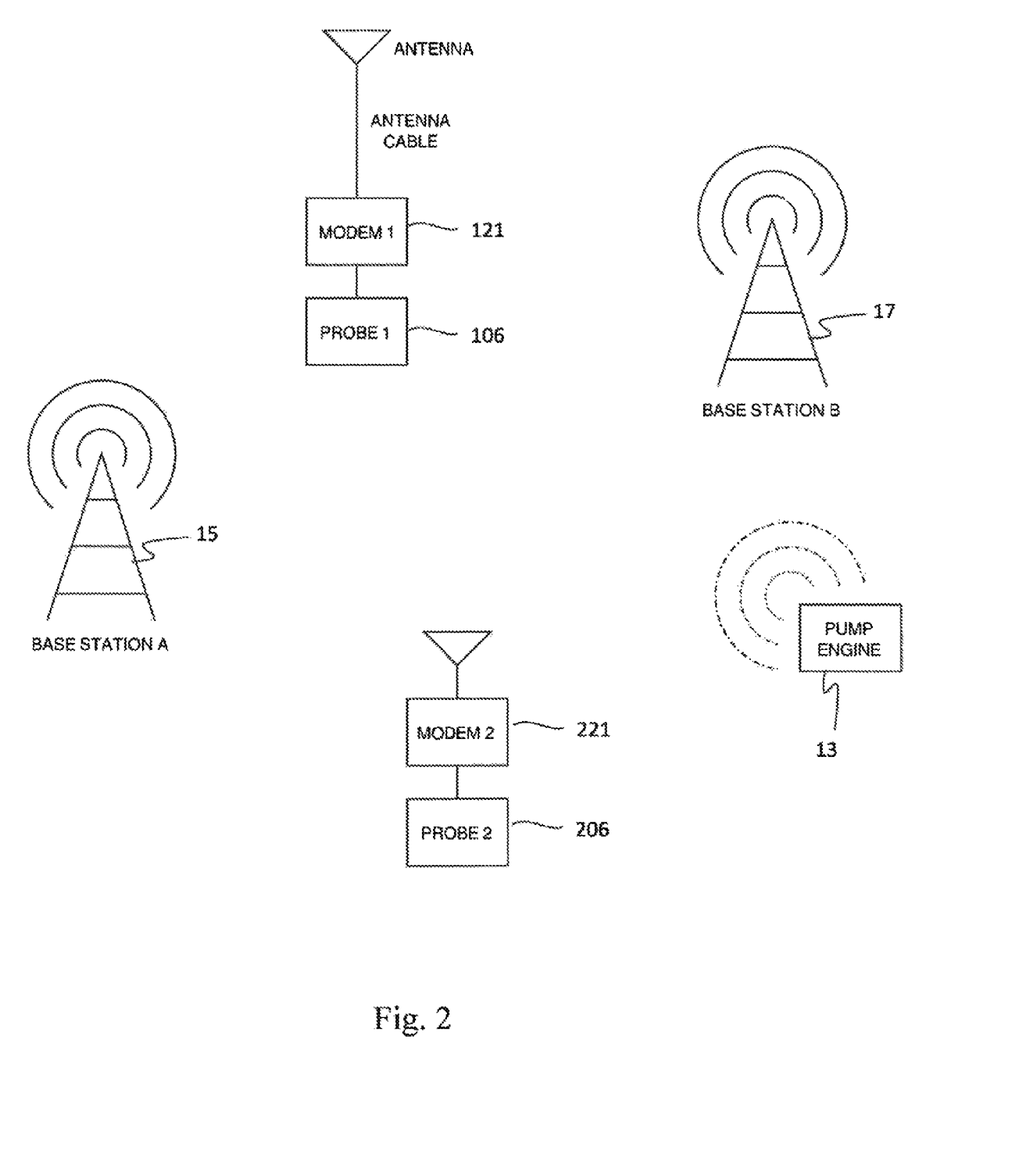
FIG. 2 schematically illustrates an exemplary application for an embodiment of the invention.

FIG. 2 schematically illustrates a plurality of clients 106, 206 arranged on corresponding vehicles moving in a specific area. Naturally, there may be more than one client arranged on one vehicle, and more than two vehicles within the same area. The clients are here arranged to communicate through modems 121, 221. Furthermore, the clients may each be connected to a base station 15 or 17. In the exemplary case shown in FIG. 2, a source of error is a source of noise in the form of a poorly shielded pump engine 13 near base station 17. Note that the poorly shielded pump engine 13 is only used as an example and many other sources of noise are conceivable. The pump engine 13 causes an increased noise in clients moving in the vicinity of the pump engine 13. From collected signal quality data with corresponding positions and times, and with movement of clients over an extended period of time in the area, the location of the pump engine 13 may be triangulated. For example, in the collected signal quality data having corresponding times and positions of clients, anomalies as increased levels of noise may be seen in the signal quality data collected near a certain location, and at certain times. Thus, via pattern analysis of the collected signal quality data, periodic increases of noise may be detected. Furthermore, the source of the noise may be located to a location corresponding to the location of the pump 13 and the to times corresponding to the operating hours of the pump 13.

The positions of the clients may be acquired from a real-time locating system of the client, for example a GPS of the client. Furthermore, the position may be interpolated from a real-time locating system as part of wireless wide area network communication (WWAN). Note that the clients moving in the area are replaceable. In other words, the collected signal quality data may come from several clients over different time periods. For example, one client may only pass in the area once and other clients may travel in the area for a longer period. Furthermore, other additional clients not shown in the FIG. 2 may enter the area and contribute to the collected signal quality data.

Furthermore, a connection technology type and throughput measurements performed by the clients 106, 206 may be included in the signal quality data. In this way a base station (e.g. base station 17) that is unable to deliver satisfactory performance of the technology type they support may be identified.

Figure 3:
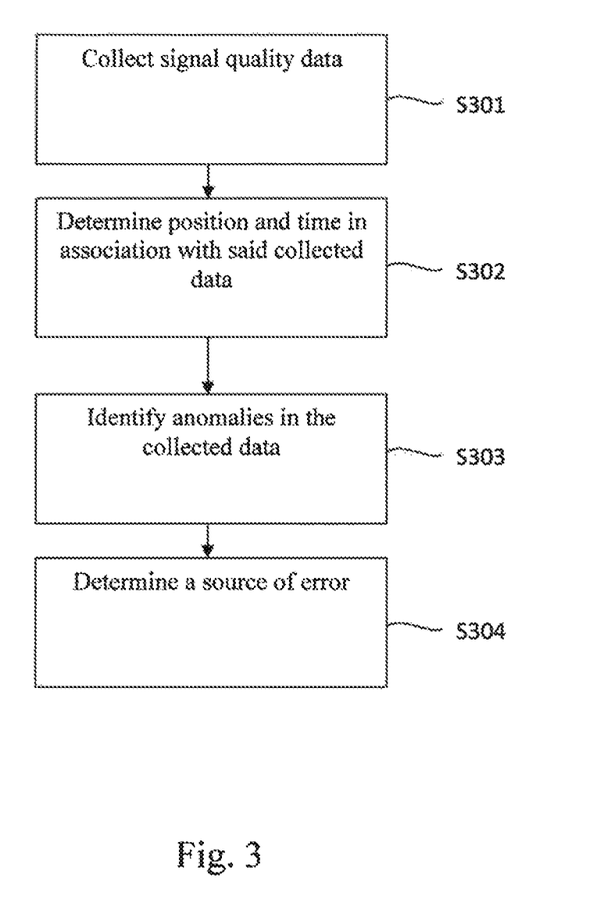
FIG. 3 provides a flowchart showing method steps according to an exemplary embodiment of the invention.

FIG. 3 provides a flow-chart showing the steps of a method according to an embodiment of the invention. The method is based on having at least one client arranged on a vehicle moving repetitively in an area. Each of the at least one client is configured to connected to a base station in the area. In a first step S301, signal quality data is collected from the client over an extended period of time. The signal quality data is indicative of the signal quality between the client and the base station. The signal quality data comprises a plurality of data entries. In a subsequent step S302, a time and position for each of the data entries is determined. In other words, the time when a data entry was collected is determined and a position of the client when the data entry was collected is determined. In step S303, an anomaly in the signal quality data is determined by comparing newly collected signal quality data with previously collected signal quality data. The anomaly may for example be a deviation in signal strength or an increase in noise. From the time and position of the data entry/entries related to the anomaly, a source of error may be determined in step S304. This can for example be made by triangulation of the movements of the clients when moving in the area having a source of noise, and based on this, a source of error may be determined. Additionally or alternatively, it may be determined from pattern recognition that e.g. a 3 dB difference in signal strength is consistently found near a base station, which would indicate a source of error at the base station. For example, there may be a problem so that the base station is in some way malfunctioning or delivering poor performance. The signal quality data may for example be signal strength and/or signal-to-noise data.

In one embodiment, a step of determining an average signal quality data is performed. In this case, new collected signal quality data is compared with the average signal quality data.

Optionally, a client identifier and/or a base station identifier is received from the client for identifying the client from which the signal quality data was collected and/or the corresponding base station.

The invention has now been described with reference to specific embodiments. However, variations to the disclosed embodiments can be understood and effected by the skilled person in practicing the claimed invention, from a study of the drawings, the disclosure, and the appended claims. For example, the client doing the measurement can be arranged as separate units, probes, connecting to modems or the like on-board the vehicle, but may also be realized within the modem or router. Further, the communication system may be used on various types of vehicles. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claim is:

1. Method for identifying a source of error in a communication network comprising at least one client configured to be connected to a base station, wherein said at least one client is arranged on a vehicle repetitively moving in a predetermined area comprising at least one base station, and wherein said vehicle is provided with at least one fixed external antenna through which the client and the base station communicates, said method comprising the steps of:
   collecting signal quality data from said at least one client for an extended time period when moving in said area, said signal quality data being indicative of the signal quality between said at least one client and said at least one base station, said signal quality data comprising a plurality of data entries;
   determining a position in said area at which each of said data entries was collected and a time at which each of said data entries was collected;
   identifying an anomaly in said signal quality data, by comparing newly collected signal quality data with previously collected signal quality data; and
   determining, for at least one identified anomaly, from the time and position when said signal quality data having an anomaly was collected, a source of error in said communication network.

2. The method according to claim 1, further comprising determining average signal quality data from the previously collected signal quality data, and comparing the newly collected signal quality data with the average signal quality data.

3. The method according to claim 2, further comprising determining said average signal quality from previously collected signal quality data collected from clients connected to base stations other than the base station connected to said at least one client when said newly collected data was collected corresponding to said anomaly.

4. The method according to claim 1, further comprising collecting data from several clients.

5. The method according to claim 1, further comprising receiving a client identifier for identifying the client from which the corresponding signal quality data was collected.

6. The method according to claim 1, wherein said signal quality data comprises signal strength and/or signal-to-noise data.

7. The method according to claim 1, further comprising receiving a base station identifier for identifying said base station.

8. The method according to claim 1, wherein said signal quality data comprises data indicative of a connection technology, voice call quality indicator, channel frequency and bandwidth, network latency, and/or data throughput.

9. The method according to claim 1, further comprising interpolating said position from a real-time locating system.

10. System for identifying a source of error in a communication network comprising at least one client connected to a base station, wherein said at least one client is arranged on a vehicle repetitively moving in a predetermined area, wherein said vehicle is provided with at least one fixed external antenna through which said client and said base station communicates, said system comprising a central control unit configured to execute the steps according to claim 1, wherein said central control unit is configured to receive said signal quality data over said communication network.

11. The system according to claim 10, further comprising a real-time locating system.

12. The system according to claim 11, wherein said real-time locating system is a global navigation satellite system (GNSS) unit of said client.

13. A computer program product comprising a computer readable medium having stored thereon computer program means for executing the steps of claim 1.

14. The method according to claim 1, further comprising collecting data from several clients arranged on several vehicles repetitively moving in a predetermined area comprising at least one base station, and wherein each of said vehicles is provided with at least one fixed external antenna through which the respective client and the base station communicate.

15. The method according to claim 1, wherein said signal quality data comprises data indicative of a connection technology type and/or channel frequency.

16. The method according to claim 1, wherein the client is an on-board router for providing communication between client terminals within the vehicle and at least one exterior wireless network.

17. the method according to claim 16, wherein the router is arranged to operate through a plurality of exterior networks that are simultaneously useable.

18. The method according to claim 1, further comprising:
   determining median signal quality data from the previously collected signal quality data; and comparing the newly collected signal quality data with the median signal quality data.

* * * * *